(12) United States Patent
Kawasaki (10) Patent No.: US 6,810,326 B1
(45) Date of Patent: Oct. 26, 2004

(54) NAVIGATION APPARATUS (75) Inventor: Shingo Kawasaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/286,344

(22) Filed: Nov. 1, 2002

(30) Foreign Application Priority Data

Nov. 15, 2001 (JP) ........................................ 2001-349686

(51) Int. Cl.[7] ............................................. G01C 21/30
(52) U.S. Cl. ....................... 701/209; 701/208; 701/211; 340/990; 340/995.21
(58) Field of Search ................................ 701/200, 201, 701/202, 207, 208, 209, 210, 211, 213; 340/990, 995.13, 995.21

(56) References Cited

U.S. PATENT DOCUMENTS

| | | | |
|---|---|---|---|
| 5,802,492 A | | 9/1998 | DeLorme et al. |
| 5,911,773 A | * | 6/1999 | Mutsuga et al. ............ 701/200 |
| 5,987,375 A | | 11/1999 | Tamai |
| 6,018,697 A | * | 1/2000 | Morimoto et al. .......... 701/209 |
| 6,138,073 A | * | 10/2000 | Uchigaki .................... 701/208 |
| 6,278,940 B1 | | 8/2001 | Endo |

FOREIGN PATENT DOCUMENTS

EP          0 905 481 A1    3/1999

OTHER PUBLICATIONS

Yamada et al. (US 2001/0024203 A1) published Sep. 27, 2001 filed Mar. 19, 2001: map display device, a memory medium an a map display method.*

* cited by examiner

Primary Examiner—Gertrude A. Jeanglaude
(74) Attorney, Agent, or Firm—Brinks Hofer Gilson & Lione (57) ABSTRACT When a facility is specified from a facility list indicating facilities which satisfy a facility searching condition, a path searching processing section searches for a driving path with the specified facility being set as a destination, and obtains information such as driving distance and driving time required when a vehicle travels the driving path to the destination. A text-information generating and drawing section generates drawing data for displaying text information, such as the driving distance and the driving time, and stores the drawing data in a VRAM. A map drawing section generates drawing data for displaying a map image of an area which includes the driving path and stores the drawing data in the VRAM. An image synthesis section synthesizes the drawing data stored in the VRAM and the drawing data supplied from an operation-screen generation section, and causes a display apparatus to display a search image which includes the facility list, the text information, and the map image on one screen.

20 Claims, 10 Drawing Sheets

NAVIGATION APPARATUS

BACKGROUND OF THE INVENTION

1. Field of the Invention

The present invention relates to navigation apparatuses for displaying map images and for searching for various facilities.

2. Description of the Related Art

On-vehicle navigation apparatuses generally have a map display function for displaying a map image of the area surrounding the position of a vehicle on a screen, a path searching function for searching for a path to a destination or an intermediate location specified by the user, and a path guiding function for guiding the vehicle along the path set by path searching.

Most recent navigation apparatuses include a facility searching function for searching for various facilities to be set as a destination in path searching. When a search condition is specified in the facility searching function, such as a facility genre (for example, a park) or a prefecture in which a facility is located, facilities which satisfy the specified searching condition are searched for and the names of the facilities are listed and displayed. When the user selects a desired facility from the list and sets the destination to the location of the facility, path guiding to the desired facility can be performed.

When the user selects a facility as a destination from the list of facilities searched for by the above-described facility searching function, the user often wants to know details (such as a driving distance and driving time) of a driving path to the facility. In conventional navigation apparatuses, however, to know the details of a driving path to a desired facility, it is necessary to set the facility as a destination, execute path searching, and refer to information obtained as a search result, such as a driving distance and driving time. Therefore, when details of the driving paths to several facilities are required, it is necessary to repeat the operations of setting one facility as a destination, instructing the execution of path searching, and referring to the information obtained as a search result. Accordingly, this conventional method of operation is troublesome for a user.

SUMMARY OF THE INVENTION

The present invention has been made in consideration of the foregoing problem. An object of the present invention is to provide a navigation apparatus which gives details of a driving path to each of a plurality of facilities without troublesome operations.

To solve the above-described problem, a navigation apparatus according to the present invention includes a facility searching means that searches for a plurality of facilities which satisfy a facility searching condition set by a condition setting means, and a drawing means that draws a search image in which the plurality of searched facilities is displayed in a list form on a screen as choices. When one of the plurality of facilities is specified as a selection candidate, path information of a path to the specified facility is displayed on the same screen including the choices. A display means displays the search image drawn by the drawing means on a screen, and, when the search image is displayed on the screen of the display means, a search-candidate specifying means specifies the facility corresponding to the choice included in the search image as the selection candidate.

When a simple operation of specifying selection candidates from among a plurality of facilities displayed as choices in a list form on a screen is performed, path information of a path to each of the specified facilities is displayed. Therefore, without repeating a troublesome operation, details of driving paths to a plurality of facilities can be understood.

It is preferred that the navigation apparatus further include path searching means for searching for a driving path to reach each of the plurality of facilities searched for by the facility searching means, and path-information generation means for generating the path information corresponding to each of the plurality of facilities according to the result of the searching performed by the path searching means. Since the path information is generated according to the result of searching for a driving path to each facility, the path information includes actual road information and is more detailed.

It is also preferred that the path information include at least the driving distance and the driving time required to reach each of the plurality of facilities. Since the driving distance and driving time are presented as path information, details of the driving path to each facility can be more specifically understood.

It is also preferred that the path information include a driving charge required for a toll road when the toll road is included in a driving path to a facility. With this feature, since whether the toll of a toll road is required is identified, and, if it is required, the amount of the toll is identified, details of the driving path are more accurately understood.

It is also preferred that the path information include a map image which includes a driving path to a facility. Since a map image including the driving path is displayed, geographical information (such as natural features and the name of a city near the facility) related to the driving path to the facility is easily understood.

It is also preferred that the navigation apparatus further include position detection means for detecting the position of a vehicle, and the map image include the entire driving path which connects the facility specified by the search-candidate specifying means and the position of the vehicle detected by the position detection means. Since the map image includes the entire driving path, the condition (such as a passing-through area and the types of roads included in the driving path) of the driving path to the facility is easily understood on the map.

It is preferred that the drawing means display the selected facility and the position of the vehicle in an emphasized manner. With this feature, the starting point and the ending point of the driving path are easily understood.

It is also preferred that the drawing means display the entire driving path in an emphasized manner. With this feature, the driving path is easily differentiated from other roads included in the map image, and hence, the driving path is easily understood.

It is also preferred that the drawing means display a toll road included in the driving path in an identifiable manner. With this feature, the percentage and the position of the toll road in the driving path is easily and visually understood.

It is preferred that the drawing means draw a search image which has a first area in which the choices are included and a second area disposed at the left or right of the first area, in which the path information is included. Generally, on-vehicle navigation apparatuses are provided with a display having a landscape display screen. Therefore, when the first area which includes the choices and the second area which includes the path information are disposed horizontally, the landscape display screen is effectively used and an easy-to-see search screen is displayed.

It is preferred that, when only some of the facilities searched for by the facility searching means are included in the search image in the screen displayed by the display means, the path searching means conduct searching for the displayed portion of the facilities. Even when there are a large number of facilities which satisfy the facility search condition, since search processing is performed only for a displayed portion of the facilities, that is, facilities having a high probability of being specified as a selection candidate, only the most likely processing is efficiently performed.

It is preferred that the drawing means specify the order of the choices to be displayed in a list form according to the driving time required to reach each facility along the driving path searched for by the path searching means. The drawing means alternatively may specify the order of the choices to be displayed in a list form according to the driving distance to each facility along the driving path searched for by the path searching means. When the order of the choices to be displayed in a list form is specified according to driving time or driving distance, a facility suited to a desired driving time or a desired driving distance is easily found according to the listed driving time or the listed driving distance, and the path information to the facility is obtained.

The foregoing object is achieved in another aspect of the present invention through the provision of a navigation apparatus including a condition setting section for setting a facility searching condition; a facility searching section for searching for a plurality of facilities which satisfy the facility searching condition set by the condition setting section; a drawing section for drawing a search image in which the plurality of facilities searched for by the facility searching section is displayed in a list form on a screen as choices, and in which, when one of the plurality of facilities is specified as a selection candidate, path information of a path to the specified facility is displayed on the same screen including the choices; a display section for displaying the search image drawn by the drawing section on a screen; a search-candidate specifying section for specifying, when the search image is displayed on the screen of the display section, the facility corresponding to the choice included in the search image as the selection candidate; a path searching section for searching for a driving path to each of the plurality of facilities searched for by the facility searching section; and a path-information generation section for generating the path information corresponding to each of the plurality of facilities according to the result of searching performed by the path searching section.

The foregoing object is achieved in still another aspect of the present invention through the provision of a facility searching method for a navigation apparatus, including the steps of setting a facility searching condition; searching for a plurality of facilities which satisfy the set facility searching condition; drawing a search image in which the plurality of searched facilities is displayed in a list form on a screen as choices, and in which, when one of the plurality of facilities is specified as a selection candidate, path information of a path to the specified facility is displayed on the same screen including the choices; displaying the drawn search image on a screen; and specifying, when the search image is displayed on the screen, a facility corresponding to one of the choices included in the search image as the selection candidate.

As described above, according to the present invention, when a simple operation of specifying selection candidates from among a plurality of facilities displayed in a list form as choices is performed, path information of a path to each of the specified facilities is displayed. Therefore, without repeating a troublesome operation, details of the driving paths to a plurality of facilities can be understood.

DESCRIPTION OF THE PREFERRED EMBODIMENTS

A navigation apparatus according to an embodiment of the present invention will be described below by referring to the drawings.

Figure 1:
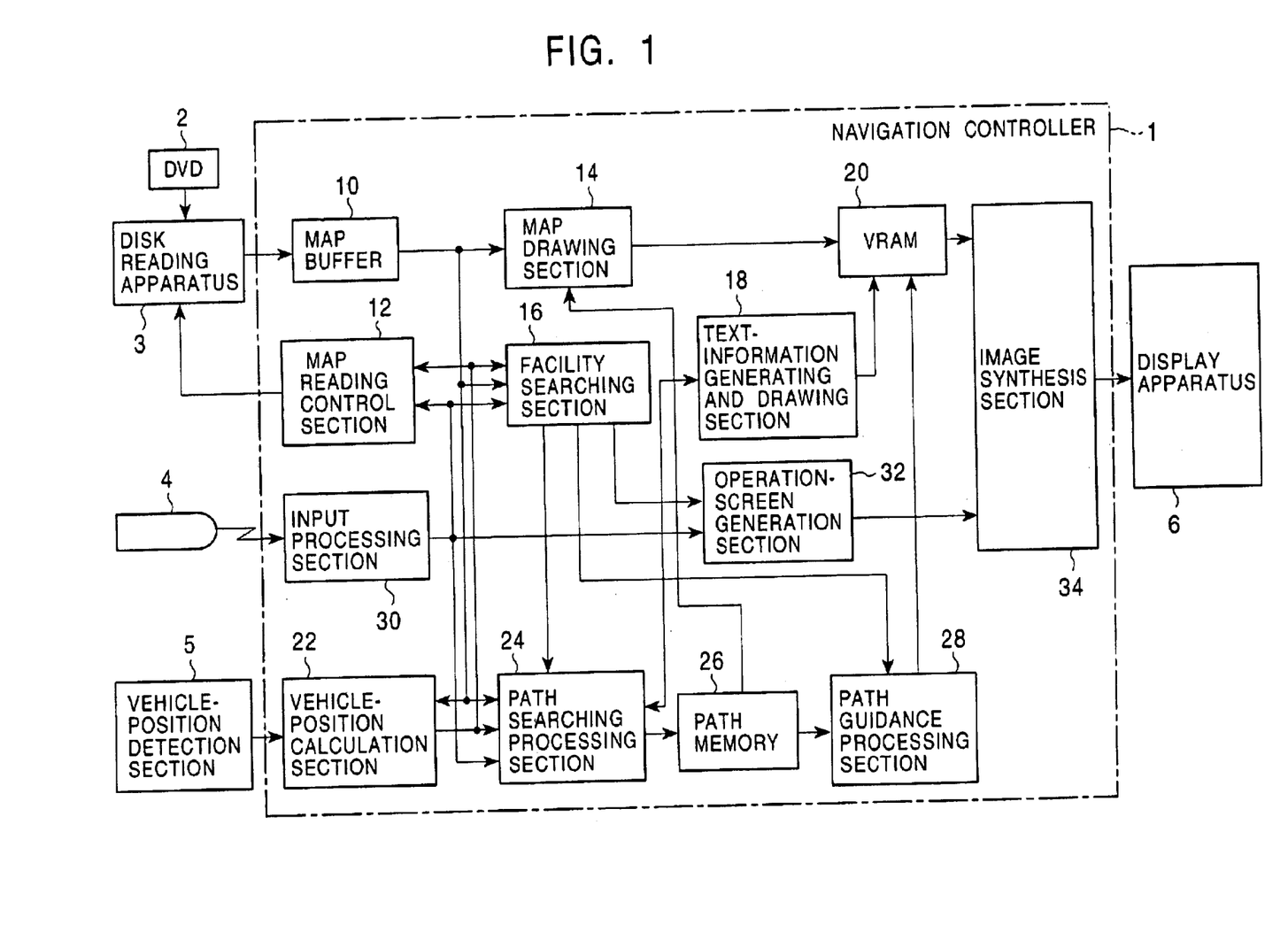
FIG. 1 is a block diagram of a navigation apparatus according to an embodiment of the present invention.

FIG. 1 is a block diagram showing the general structure of the navigation apparatus according to the present embodiment. The navigation apparatus shown in FIG. 1 includes a navigation controller 1, a DVD 2, a disk reading apparatus 3, a remote control unit 4, a vehicle-position detection section 5, and a display apparatus 6.

The navigation controller 1 controls the entire operation of the navigation apparatus. The navigation controller 1 uses a CPU, a ROM, and a RAM to execute a predetermined program to implement its function. A detailed structure of the navigation controller 1 will be described later.

A DVD 2 is a recording medium which includes stored map data required for displaying maps and searching for paths. The DVD 2 stores the map data in units of rectangular areas having an appropriate size divided by longitudes and latitudes. The map data of each area is identified by its area number and can be read. The map data of each area includes (1) "a drawing unit" formed of various types of data required for displaying a map image, (2) "a road unit" formed of various types of data required for processing of map matching, path searching, and path guidance, (3) "an intersection unit" formed of various types of data expressing detailed information of intersections, and (4) detailed facility data indicating information (such as the names, the addresses of the positions, and the longitudes and latitudes) of various facilities.

The disk reading apparatus 3 can be loaded with one or a plurality of DVDs 2, and reads map data from a DVD 2 under the control of the navigation controller 1. A disk to be loaded is not necessarily a DVD. It may be a CD. The disk reading apparatus 3 also may be configured such that it can be loaded with either a DVD or a CD selectively.

The remote control unit 4 has a joystick for specifying an upper, lower, left, or right direction, a ten-key pad, and various operation keys such as a determination key for determining various settings, and provides a signal corresponding to an operation to the navigation controller 1.

The vehicle-position detection section 5 has, for example, a GPS receiver, a direction sensor, and a distance sensor, detects the position (longitude and latitude) of a vehicle at predetermined timing, and provides a detection result.

A display apparatus 6 displays various types of images, such as map images of the area surrounding the position of the vehicle and the search results of nearby facilities, according to drawing data supplied from the navigation controller 1.

A more detailed structure of the navigation controller 1 will be described next. The navigation controller 1 shown in FIG. 1 includes a map buffer 10, a map reading control section 12, a map drawing section 14, a facility searching section 16, a text-information generating and drawing section 18, a VRAM 20, a vehicle-position calculation section 22, a path searching processing section 24, a path memory 26, a path guidance processing section 28, an input processing section 30, an operation-screen generation section 32, and an image synthesis section 34.

The map buffer 10 temporarily stores map data read from the DVD 2 by the disk reading apparatus 3.

The map reading control section 12 sends a request for reading map data of a predetermined area to the disk reading apparatus 3 in response to the position of the vehicle calculated by the vehicle-position calculation section 22 or a request of the input processing section 30.

The map drawing section 14 generates map drawing data for displaying map images according to the map data stored in the map buffer 10.

The facility searching section 16 searches for a facility which satisfies a predetermined facility searching condition (such as the genre of the facility or the prefecture of the location of the facility) specified by the user with the use f the remote control unit 4. When the user uses the remote control unit 4 to specify one facility from a plurality of facilities obtained as a search result, the facility searching section 16 also sets the facility as a selection candidate.

The text-information generating and drawing section 18 generates text information (details thereof will be described later) for a driving path to the facility specified as a selection candidate, generates drawing data for displaying the text information, and stores the drawing data in the VRAM 20. The VRAM 20 temporarily stores the map drawing data supplied from the map drawing section 14 and the drawing data supplied from the text-information generating and drawing section 18.

The vehicle-position calculation section 22 calculates the position and direction of the vehicle according to detection data supplied from the vehicle-position detection section 5, and performs map matching processing for modifying the position of the vehicle when the calculated position of the vehicle is not on a road in the map data.

The path searching processing section 24 searches for a driving path which connects a starting point and a destination (or an intermediate location) specified by the user, under a certain condition. The path memory 26 stores path data corresponding to the driving path extracted by the path searching processing section 24.

The path guidance processing section 28 performs path guidance processing, such as reading the path data stored in the path memory 26 and generating drawing data for displaying the driving path (guidance path) along which the vehicle is to be guided on a map in overlapping fashion.

The input processing section 30 supplies instructions to sections of the navigation controller 1 for performing operations corresponding to various instructions received from the remote control unit 4.

The operation-screen generation section 32 generates drawing data for displaying operation screens used by the user to instruct various operations. For example, the operation-screen generation section 32 generates drawing data corresponding to an operation screen for entering a facility search condition to be used for facility searching by the facility searching section 16 and drawing data corresponding to an operation screen for displaying a plurality of facilities searched for by the facility searching section 16 in a list form as choices.

The image synthesis section 34 synthesizes the drawing data read from the VRAM 20 and the drawing data received from the operation-screen generation section 32, and provides the synthesized data to the display apparatus 6.

The remote control unit 4, the input processing section 30, and the operation-screen generation section 32 correspond to a condition setting means; the facility searching section 16 corresponds to a facility searching means; the map drawing section 14, the text-information generating and drawing section 18, and the operation-screen generation section 32 correspond to a drawing means; the display apparatus 6, the VRAM 20, and the image synthesis section 34 correspond to a display means; the remote control unit 4, the facility searching section 16, and the input processing section 30 correspond to a search-candidate specifying means; the path searching processing section 24 corresponds to a path searching means; the map drawing section 14 and the text-information generating and drawing section 18 correspond to a path-information generation means; and the vehicle-position detection section 5 corresponds to a position detection means.

The navigation apparatus according to the present embodiment has the above-described structure. The operation thereof will be described next.

Figure 2:
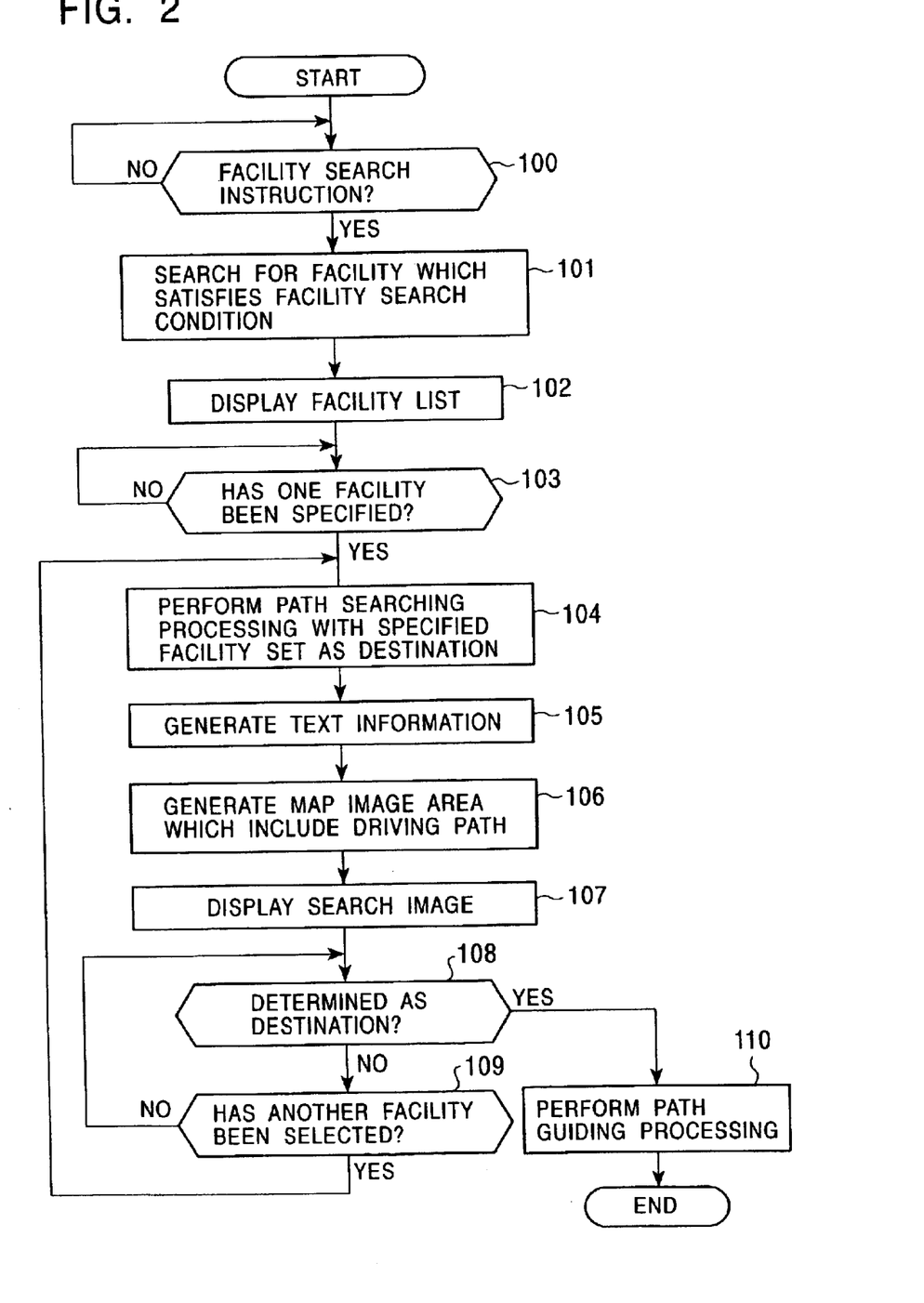
FIG. 2 is a flowchart of the operation of the navigation apparatus shown in FIG. 1.

FIG. 2 is a flowchart of the operation of the navigation apparatus. The facility searching section 16 determines (in step 100) whether the user has instructed (issued a facility searching instruction) facility searching by using the remote control unit 4. When a facility searching instruction has not yet been issued, a negative determination is obtained and the determination of step 100 is repeated.

When a facility searching instruction is issued, a positive determination is obtained in step 100, and the facility searching section 16 searches for (in step 101) a facility which satisfies a facility search condition specified according to the user's operation instruction. More specifically, a predetermined operation screen drawn by the operation-screen generation section 32 is displayed on the screen of the display apparatus 6, the user specifies a facility search condition, such as the genre (for example, a park or an amusement park) of the facility or the prefecture in which the facility is located, and a facility which satisfies the specified facility search condition is searched for.

When the facility searching section 16 finds a facility which satisfies the facility searching condition, the operation-screen generation section 32 performs processing (in step 102) for displaying the list (facility list) of a facility (or facilities) which satisfies the facility searching condition.

Next, the facility searching section 16 determines (in step 103) whether the user has specified a facility included in the facility list. When a facility has not yet been specified, a negative determination is obtained and the determination of step 103 is repeated.

When a facility is specified, a positive determination is obtained in step 103, and the facility searching section 16 instructs the path searching processing section 24 to perform path searching processing with the location of the specified facility being set as a destination. The path searching processing section 24 receives the instruction, and (in step 104) sets the specified facility as a destination and performs the predetermined path searching processing for searching for a driving path which connects the destination and the starting point (where the vehicle is currently located).

Then, the text-information generating and drawing section 18 instructs the path searching processing section 24 to calculate a driving distance, a driving time, and a driving charge (such as a charge imposed on passing through a toll road) required when the user drives the vehicle to the facility along the searched driving path. The path searching processing section 24 receives the instruction and calculates the driving distance, the driving time, and the driving charge. The text-information generating and drawing section 18 generates (in step 105) drawing data used for displaying text information which indicates those pieces of information related to the driving path. The generated drawing data is stored at a predetermined area of the VRAM 20.

The map drawing section 14 reads the driving path searched for by the path searching processing section 24 from the path memory 26 and generates map drawing data for displaying a map image of an area which includes the driving path (in step 106). The generated map drawing data is stored at a predetermined area of the VRAM 20.

Next, the image synthesis section 34 synthesizes the drawing data stored in the VRAM 20 and the drawing data received from the operation-screen generation section 32, and supplies the result to the display apparatus 6. With this operation, the facility list, the text information related to the driving path to the facility selected from the facility list, and a search image which includes the map image of an area that includes the driving path are displayed on the screen of the display apparatus 6 (in step 107).

Figure 3:
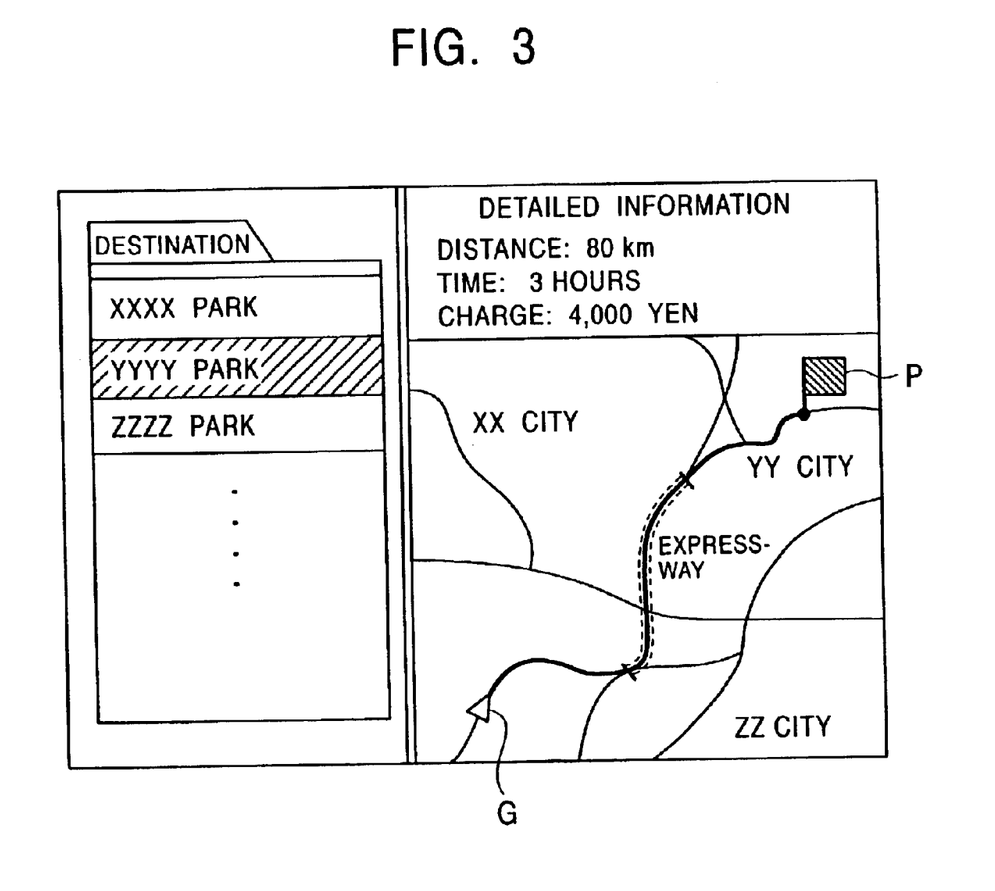
FIG. 3 illustrates an example search image.

FIG. 3 illustrates a specific example of the search image displayed in step 107. The facility list is displayed at a left-hand-side area (first area) of the screen. In the example shown in FIG. 3, a YYYY park is specified in the facility list, and path information related to a driving path obtained when the YYYY park is set as a destination is displayed at a right-hand-side area (second area) of the screen. When the display screen of the display apparatus 6 has a landscape orientation, if the first area which includes the facility list and the second area which includes the path information area are arranged in a horizontal direction, the landscape display screen is effectively used, and an easy-to-see search screen can be shown.

In FIG. 3, text information which includes a driving distance of 80 km, a driving time of 3 hours, and a driving charge of 4,000 yen is indicated at an upper right portion of the screen for the searched driving path when the YYYY park is set as a destination. Since the driving distance and the driving time are shown for the driving path to the facility, the user can specifically understand the details of the driving path to the facility. In addition, since the driving charge is also displayed, the user can determine whether payment is required, and if it is required, can determine the amount of money to be paid. Therefore, the user can understand the details of the driving path more precisely.

At a lower right portion of the screen, a map image of an area which includes the entire searched driving path when the YYYY park is set as an destination is displayed. The driving path is emphasized by a thick line. Because the map image which includes the driving path is displayed, the user can easily understand geographical information (such as natural features and the names of cities around the facility) related to the driving path to the facility. Especially since the entire driving path is included, the user can easily understand on the map the situation (such as regions the vehicle passes through and the types of roads included in the driving path) of the entire driving path to the facility. Since the entire driving path is displayed in an emphasized manner, the user can easily differentiate the driving path from other roads included in the map image, so that the user easily recognizes the driving path.

In the map image, the current vehicle position is indicated by a vehicle mark G in an emphasized manner, and the position of the YYYY park is indicated by a destination mark P in an emphasized manner. Therefore, the user can easily recognize the starting point and the ending point of the driving path.

In the map image, an expressway (toll road) included in the driving path is displayed such that it can be differentiated from other types of roads included in the driving path. In addition, the word "expressway" is indicated near the expressway to indicate that it is an expressway. Because a toll road included in the driving path is displayed such that it can be differentiated from other types of roads, the user can visually and easily understand the percentage and location of the toll road in the entire driving path.

When the search image is displayed as described above, the facility search section 16 determines (in step 108) whether an operation has been instructed to determine the currently specified facility as the destination to which the vehicle is to be guided.

When an operation for determining the facility as the destination has not yet been instructed, a negative determination is obtained in step 108, and the facility search section 16 determines (in step 109) whether another facility has been specified in the facility list. When another facility has not yet been specified, a negative determination is obtained, the processing returns to step 108, and the subsequent processes are repeated. When another facility has been specified, a positive determination is obtained in step 109, the processing returns to step 104, and the subsequent processes are repeated. With these processes, every time another facility is specified in the facility list, the content of the path information (text information and map image) is updated.

When an operation has been instructed to determine the facility as the destination, a positive determination is obtained in step 108, and the facility search section 16 instructs the path guidance processing section 28 to perform path guidance processing with the facility being set as the destination. The path guidance processing section 28 receives the instruction, and performs the predetermined path guidance processing according to the path data stored in the path memory 26 (in step 110).

As described above, when the user performs a simple operation of specifying a facility from among a plurality of facilities listed as choices in the navigation apparatus according to the present embodiment, a driving path to the specified facility is displayed. Therefore, without performing a troublesome operation, the user can understand the details of a driving path to each of a plurality of facilities. Especially since path information, such as driving distance and driving time, is generated according to a search result of a driving path to the facility, the path information includes the actual road situation and is more detailed.

The present invention is not limited to the above-described embodiment. Various modifications are possible within the scope of the present invention. In the above-described embodiment, when path information is displayed, text information, such as a driving distance and a driving time, and a map image are displayed at different areas, as shown in FIG. 3. However, the text information may be displayed on the map image in overlapping fashion.

Figure 4:
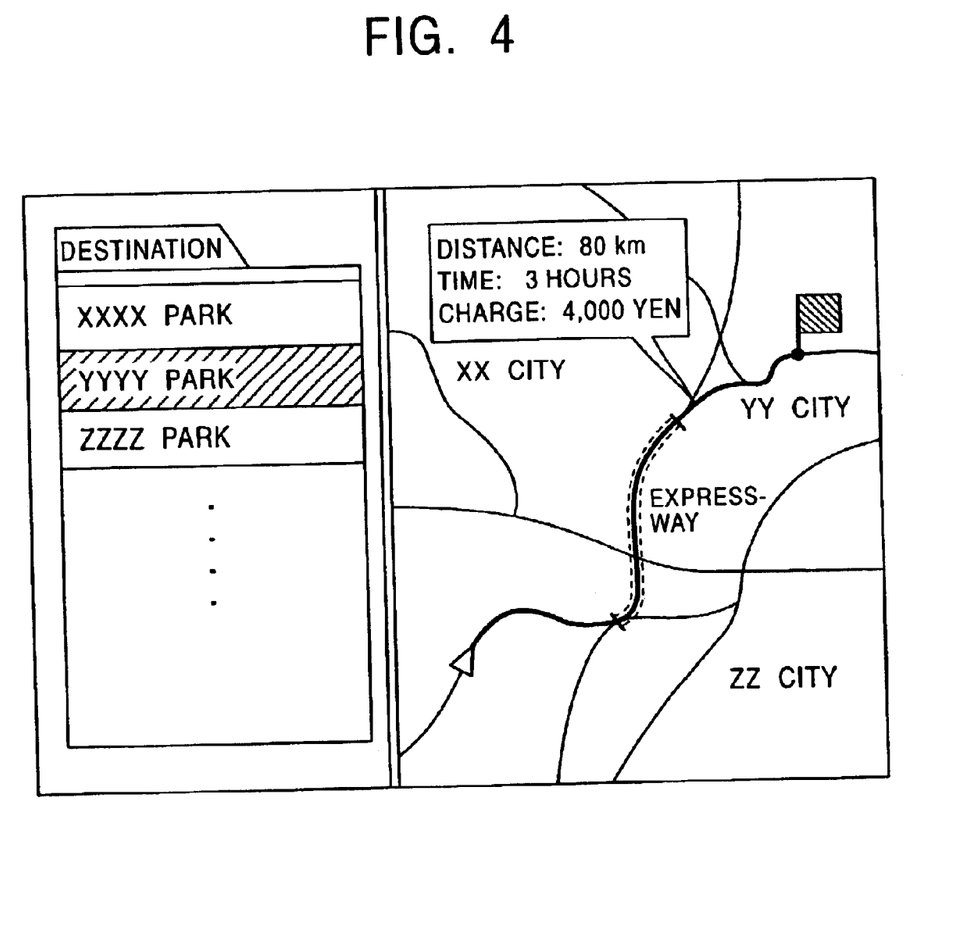
FIG. 4 illustrates an example display of path information, when text information is displayed on a map image in overlapping fashion.

FIG. 4 illustrates a display example of path information obtained when text information is displayed on a map image in overlapping fashion. As shown in FIG. 4, the map image is displayed at a right-hand side of a display screen, and the text information is displayed in overlapping fashion such that it is associated with a driving path included in the map image. When text information is overlapped with a map image to indicate path information as described above, the display area of the map image is extended.

In the above-described embodiment, each time a facility is specified, path searching processing for searching for a driving path to the facility is performed and a search image is displayed. In parallel with display processing of the search image corresponding to a facility, path searching processing for searching for driving paths to other facilities searched for according to a facility searching condition may be performed. When, in parallel with display processing of the search image corresponding to one facility, path searching processing for searching for driving paths to other facilities searched for according to a facility searching condition is performed, it is preferred that a group of (for example, five or six) facilities to be displayed in a facility list be extracted, and path searching processing for searching for a driving path to each of the facilities included in the extracted group be performed.

Figure 5:
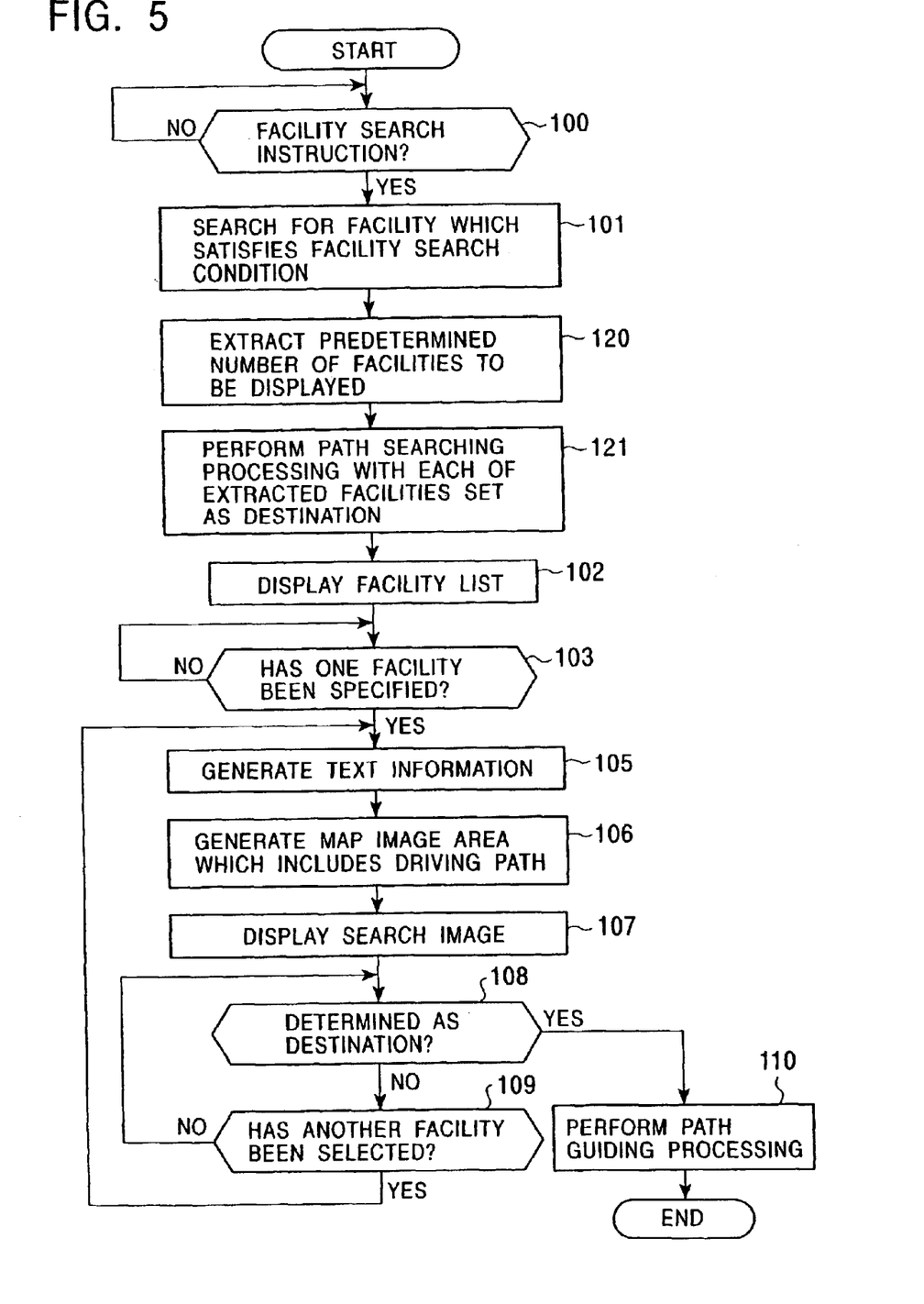
FIG. 5 is a flowchart of the operation of the navigation apparatus when a group of facilities to be displayed in a facility list is extracted and path searching processing for searching for a driving path to each of the extracted facilities is performed.

FIG. 5 is a flowchart of the operation of the navigation apparatus when a group of facilities to be displayed in a facility list is extracted, and path searching processing for searching for a driving path to each of the facilities included in the extracted group is performed. The operation procedure shown in FIG. 5 differs from that shown in FIG. 2 in that step 104 is omitted and step 120 and step 121 are added between step 101 and step 102. A description will be made below mainly focusing on the differences.

When facilities which satisfy a facility search condition are found, the facility searching section 16 extracts (in step 120) a predetermined number of (such as six or seven) facilities to be displayed in the facility list, and instructs the path searching processing section 24 to perform path searching processing with the position of each of the extracted facilities being set as a destination. The path searching processing section 24 receives the instruction, and performs (in step 121) the path searching processing for searching for a driving path which connects each facility and the starting point, with each facility extracted by the facility searching section 16 being set as the destination. The operation-screen generation section 32 displays the facility list (in step 102).

The facility searching section 16 then determines (in step 103) whether the user has specified a facility in the facility list. When one facility is specified, a positive determination is obtained in step 103, and the facility searching section 16 reports the specified facility to the map drawing section 14 and to the text-information generating and drawing section 18. The process of step 105 and subsequent processes are performed to generate text information and a map image corresponding to the specified facility and to display a predetermined search image which includes the facility list, the text information, and the map image on the screen of the display apparatus 6.

When another facility has been specified in the facility list (when a positive determination is obtained in step 109), the process of step 105 and subsequent processes are repeated for the newly specified facility to display a search image for the specified facility. When a great number of facilities satisfy a facility search condition and they cannot fit in the display screen, if the user instructs page update or the like to switch facilities to be displayed, the processes of steps 120 and 121 are performed, a predetermined number of facilities to be newly displayed are extracted, and path searching processing is executed for each facility. As described above, even when a great number of facilities satisfy a facility search condition, if searching processing is applied to a group of facilities to be displayed in the facility list, that is, only to facilities which have a high possibility of being specified as choices, only the most likely processing is efficiently performed.

In the above-described embodiment, the order of facilities included in the facility list as choices in a search image is not specifically determined. The order of facilities included in the facility list may be specified according to the driving time or the driving distance to each facility.

Figure 6:
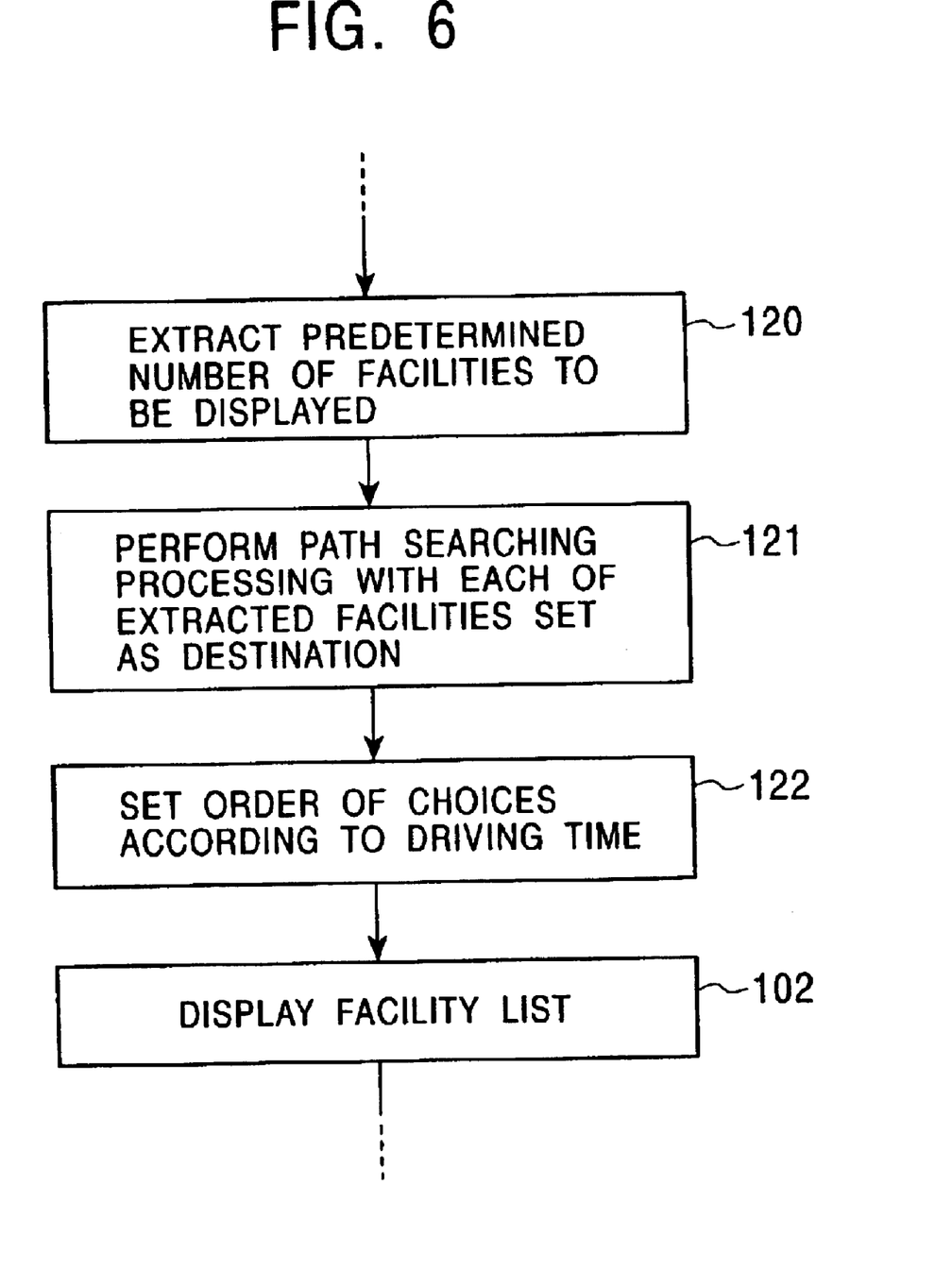
FIG. 6 is a partial flowchart of the operation of the navigation apparatus when the display order of the choices is specified according to driving time.

FIG. 6 is a partial flowchart of the operation of the navigation apparatus when the display order of the choices is specified according to driving time. The operation shown in FIG. 6 differs from the operation shown in FIG. 5 in that step 122 is added between step 121 and step 102. A description will be made below mainly focusing on the differences.

When a predetermined number of (such as six or seven) facilities to be displayed in the facility list are extracted, and path searching processing is performed with the position of each of the extracted facilities being set as a destination (in step 121), the operation-screen generation section 32 obtains the driving time to each facility, determines the order of the plurality of facilities to be displayed in the facility list as choices (in step 122), and displays the facility list according to the specified order (in step 102).

Figure 7:
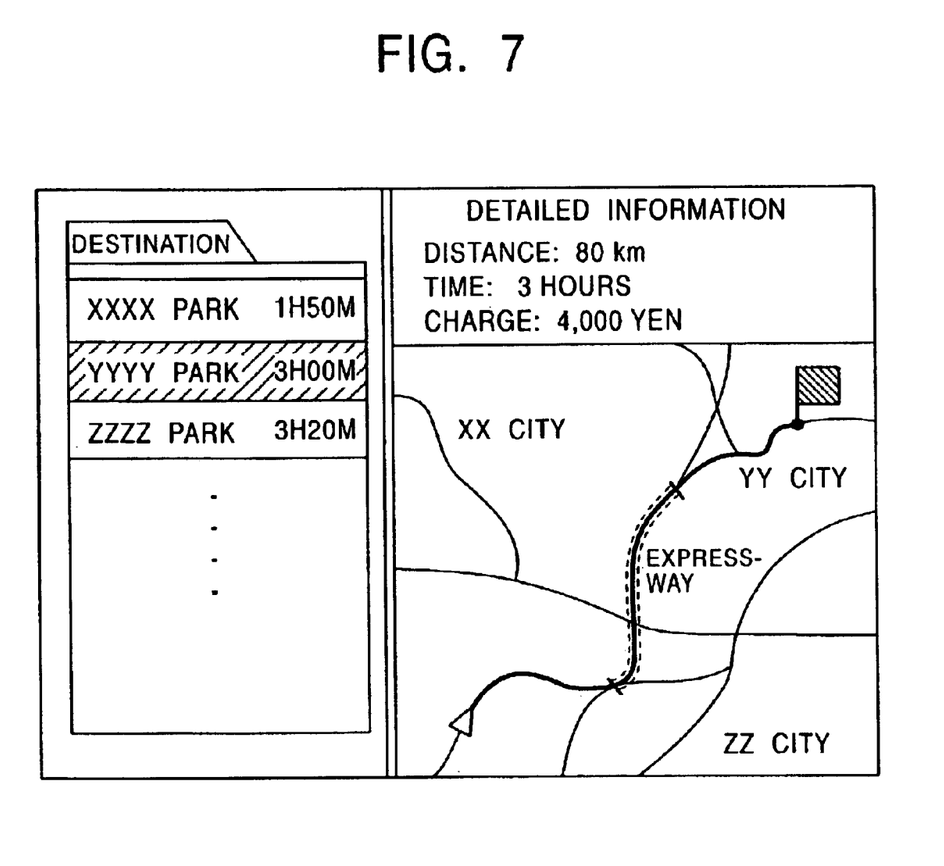
FIG. 7 illustrates an example facility list in which the order of the choices is specified according to driving time.

FIG. 7 illustrates a display example of a facility list in which the order of choices is specified according to the driving time. As shown in FIG. 7, the driving time to each facility serving as a choice is calculated as one hour and 50 minutes (in the figure, indicated by 1H 50M, and hereinafter the same notation is used) to a XXXX park, three hours to a YYYY park, three hours and 20 minutes to a ZZZZ park, and so on. According to the driving time, the facilities, or the choices, are listed from the top. As described above, the driving time to each facility is obtained, and a facility list is displayed with the facilities being listed in order according to the driving time, so that the user can easily find a facility suited to a desired driving time by using the indicated driving time, and obtain other path information.

Figure 8:
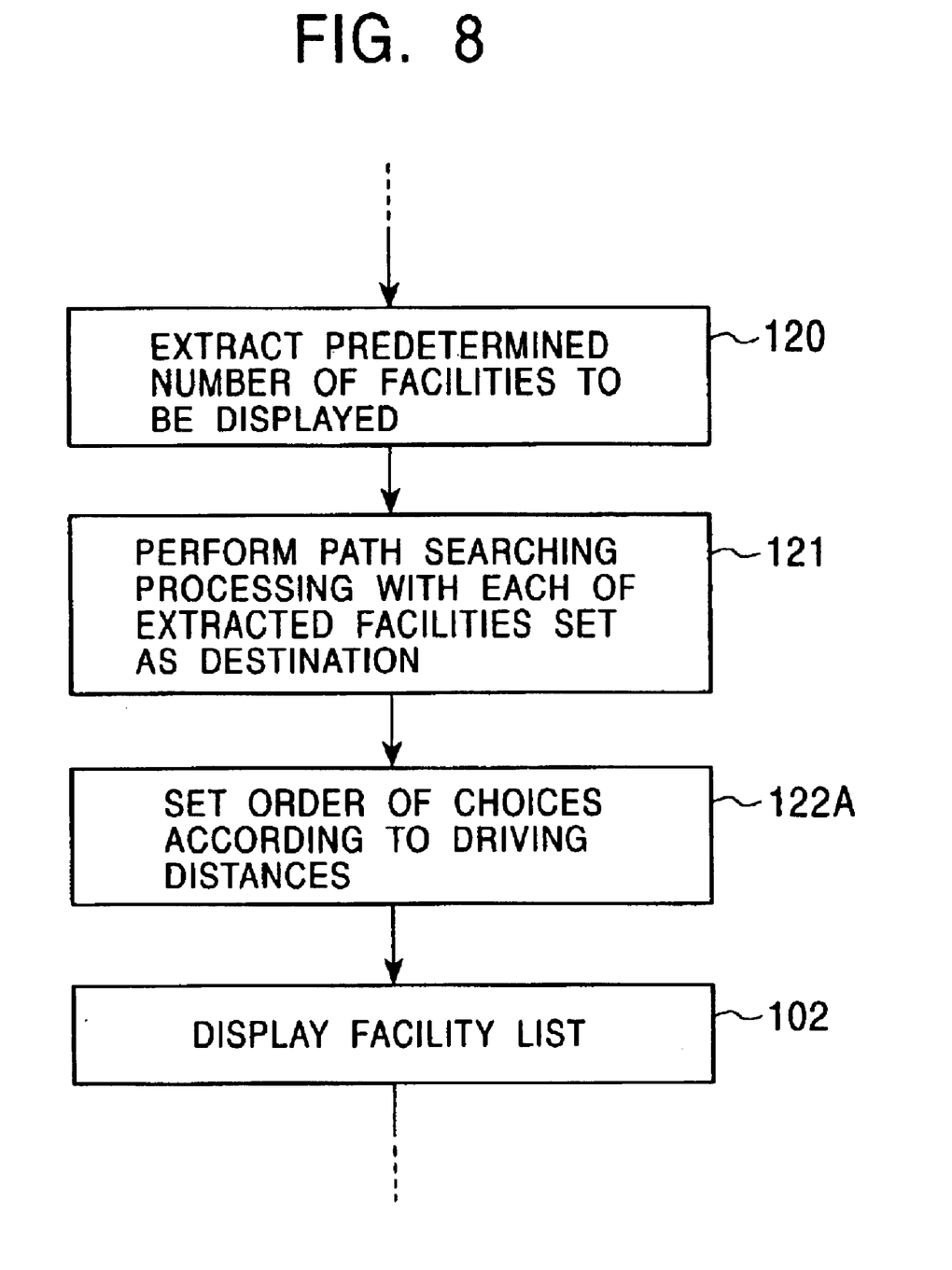
FIG. 8 is a partial flowchart of the operation of the navigation apparatus when the display order of the choices is specified according to driving distance.

FIG. 8 is a partial flowchart of the operation of the navigation apparatus when the order of choices is specified according to driving distance. The operation shown in FIG. 8 differs from the operation shown in FIG. 6 in that step 122 is replaced with step 122A. A description will be made below mainly focusing on the differences.

When a predetermined number of facilities to be displayed in the facility list are extracted, and path searching processing is performed with the position of each of the extracted facilities being set as a destination (in step 121), the operation-screen generation section 32 obtains the driving distance to each facility, determines the order of the plurality of facilities to be displayed in the facility list as choices (in step 122A), and displays the facility list according to the specified order (in step 102).

Figure 9:
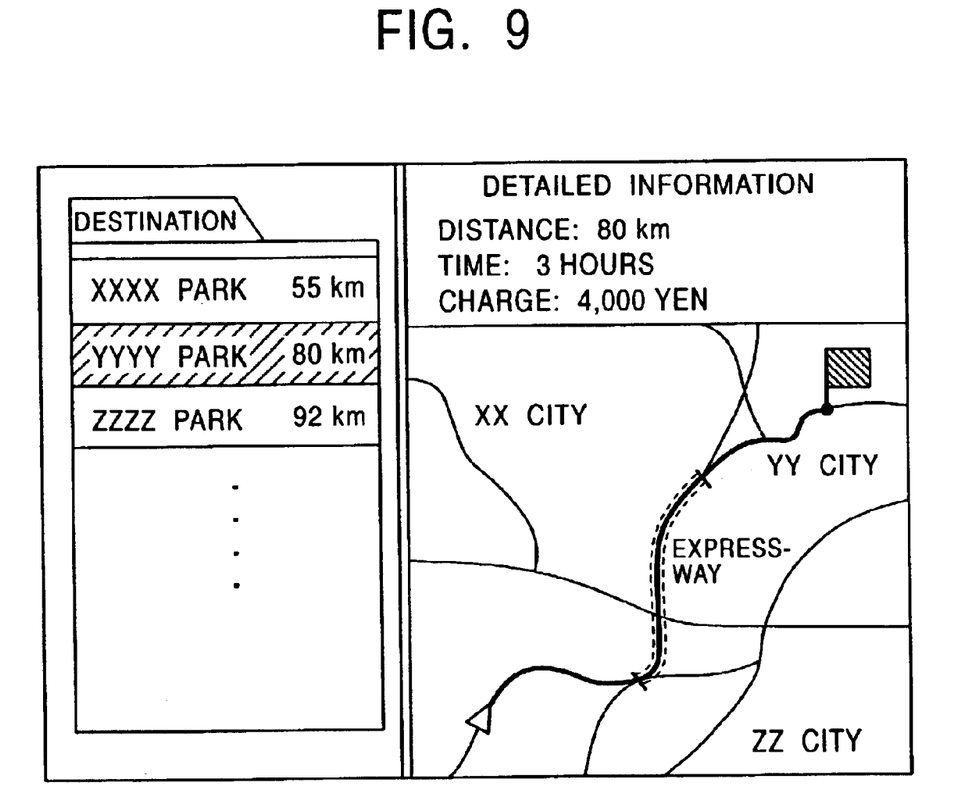
FIG. 9 illustrates an example facility list in which the order of the choices is specified according to driving distance.

FIG. 9 illustrates a display example of a facility list in which the order of choices is specified according to the driving distance. As shown in FIG. 9, the driving distance to each facility serving as a choice is calculated as 55 km to the XXXX park, 80 km to the YYYY park, 92 km to the ZZZZ park, and so on. According to the driving distances, the facilities, or the choices, are listed from the top. As described above, the driving distance to each facility is obtained, and a facility list is displayed with the facilities being listed in order according to the driving distance, so that the user can easily find a facility suited to a desired driving distance by using the indicated driving distances, and obtain other path information.

In the same way as the order of choices can be determined according to the driving time or the driving distance, the order of choices may be determined according to a required payment. The navigation apparatus may be configured such that the user can select a reference used for specifying the order of choices, from a driving distance, driving time, and required payment. In the above-described modifications, the order of choices is specified for a predetermined number of facilities to be displayed in a facility list. The order of choices may be specified according to driving time or a driving distance after path searching processing is applied to all facilities which satisfy a facility searching condition.

In the above-described embodiment, text information, such as a driving distance and driving time, and a map image are displayed as path information. The navigation apparatus may be configured such that only text information is displayed as path information and a map image is omitted, to reduce the processing load. In the above-described embodiment, text information includes a driving distance, driving time, and required payment. The content of the text information is not limited to those items. Other information, such as an expected arrival time at each facility, may be included.

In the above-described embodiment, when one facility is specified, one driving path to the facility is searched for and path information related to the searched driving path is displayed. Alternatively, path information related to a plurality of driving paths searched for according to various conditions (such as the minimum distance or a priority placed on expressways) may be displayed.

In the above-described embodiment, a driving path to one facility is searched for and path information related to the driving path is displayed. Information such as the address of the facility or the straight-line distance between the vehicle position and the location of the facility also may be displayed as path information.

Figure 10:
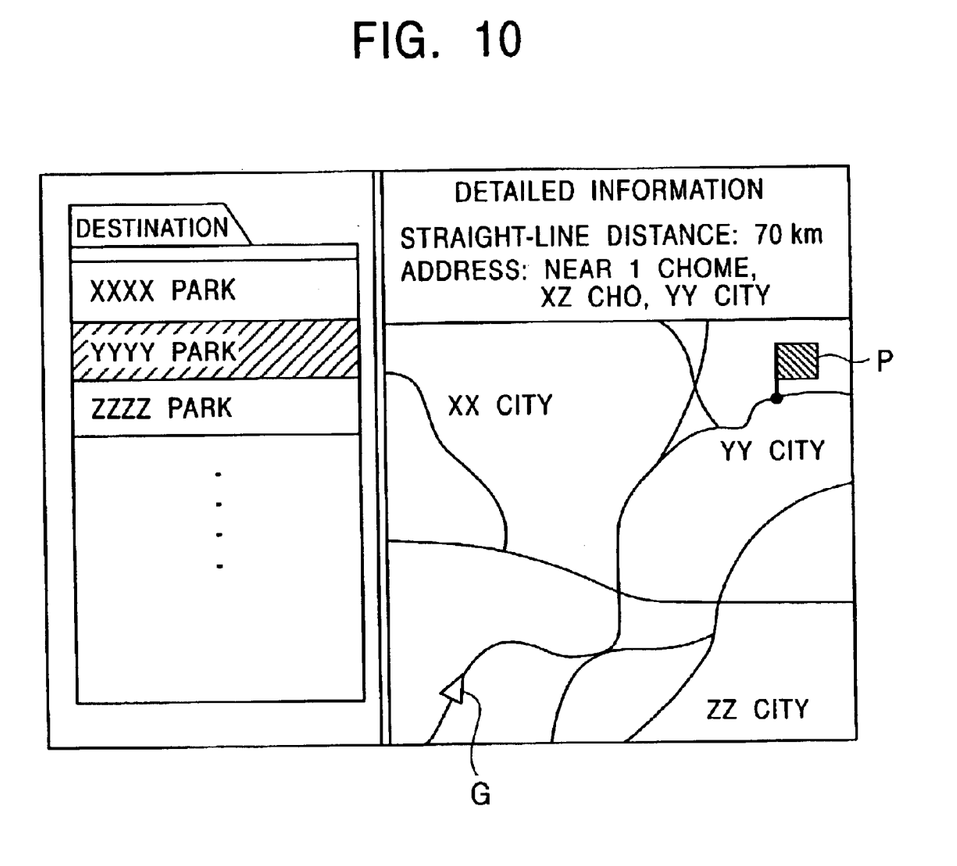
FIG. 10 illustrates example path information in which the address of a facility is displayed.

FIG. 10 illustrates a display example of path information obtained when the address of a facility is displayed. In the case shown in FIG. 10, text information is displayed at an upper right portion of a screen such that the address of a facility is close to 1 chome, XZ cho, YY city, and the straight-line distance between the current vehicle position and the location of the facility is 70 km. In addition, at a lower right portion of the screen, a map image of an area which includes the current vehicle position indicated by a vehicle mark G and the location of the facility indicated by a destination mark P is displayed. When the address of a facility and the straight-line distance between the current vehicle position and the location of the facility are indicated in this way, the user can roughly determine a driving time by using the user's knowledge and experience. In addition, since a map image of an area which includes the current vehicle position and the location of the facility is displayed, the user intuitively understands the sense of distance and the condition of a road to the facility more easily. Further, compared with a case in which a driving path to the facility is searched for, the processing load is reduced.

What is claimed is:

1. A navigation apparatus comprising:
    a condition setting section for setting a facility searching condition;
    a facility searching section for searching for facilities which satisfy the facility searching condition set by the condition setting section;
    a drawing section for drawing a search image in which a plurality of the facilities found by the facility searching section are displayed in a list form on a screen as choices, and in which, when one of the facilities is specified as a selection candidate, path information of a path to the specified facility is displayed on the same screen as the listed facilities;
    a display section for displaying the search image drawn by the drawing section on a screen; and
    a search-candidate specifying section for specifying a displayed facility as a selection candidate.

2. A navigation apparatus according to claim 1, further comprising:
    a path searching section for searching for a driving path to a facility searched for by the facility searching section; and
    a path-information generation section for generating the path information for a facility according to a result of searching performed by the path searching section.

3. A navigation apparatus according to claim 2, wherein the path information includes at least one of a driving distance and a driving time to reach the facility.

4. A navigation apparatus according to claim 2, wherein the path information includes a map image which includes a driving path to reach the facility.

5. A navigation apparatus according to claim 2, wherein the path information includes a driving charge for a toll road when the toll road is included in a driving path to reach the facility.

6. A navigation apparatus according to claim 4, further comprising a position detection section for detecting the position of a vehicle,
    wherein the map image includes a driving path which connects the facility serving as the selection candidate specified by the search-candidate specifying section and the position of the vehicle detected by the position detection section.

7. A navigation apparatus according to claim 6,
    wherein the drawing section is capable of displaying the facility serving as the selection candidate and the position of the vehicle in an emphasized manner;
    the drawing section is capable of displaying the driving path in an emphasized manner; and the drawing section displays a toll road included in the driving path in an identifiable manner.

8. A navigation apparatus according to claim 2, wherein the drawing section draws the search image which has a first area in which the choices are included and a second area in which the path information is included.

9. A navigation apparatus according to claim 2, wherein only a portion of the facilities searched for by the facility searching section is included in the search image in the screen displayed by the display section, and the path searching section applies searching processing to the displayed portion of the facilities.

10. A navigation apparatus according to claim 2, wherein the drawing section specifies the order of the choices to be displayed in a list form, according to one of a driving time or a driving distance to reach each facility along a driving path searched for by the path searching section.

11. A navigation apparatus comprising:

a condition setting section for setting a facility searching condition;

a facility searching section for searching for facilities which satisfy the facility searching condition set by the condition setting section;

a drawing section for drawing a search image including a plurality of the facilities found by the facility searching section;

a display section for displaying the search image drawn by the drawing section on a screen;

a search-candidate specifying section for specifying, when the search image is displayed on the screen of the display section, a facility included in the search image as a selection candidate;

a path searching section for searching for a driving path to reach a facility searched for by the facility searching section; and a path-information generation section for generating path information corresponding to a driving path searched by the path searching section;

wherein the path information is displayed on the same screen as the found facilities.

12. A navigation apparatus according to claim 11, wherein the path information includes at least one of a driving distance and a driving time to reach a facility.

13. A navigation apparatus according to claim 11, wherein the path information includes a map image which includes a driving path to reach a facility.

14. A navigation apparatus according to claim 11, wherein the path information includes a driving charge for a toll road when the toll road is included in a driving path to a facility.

15. A navigation apparatus according to claim 13, further comprising a position detection section for detecting the position of a vehicle, wherein the map image includes a driving path which connects the facility serving as the selection candidate specified by the search-candidate specifying section and the position of the vehicle detected by the position detection section.

16. A navigation apparatus according to claim 15, wherein the drawing section is capable of displaying in an emphasized manner at least one of the facility serving as the selection candidate and the position of the vehicle; the driving path; and a toll road included in the driving path.

17. A facility searching method for a navigation apparatus, comprising:

setting a facility searching condition;

searching for facilities which satisfy the set facility searching condition;

drawing a search image in which a plurality of the facilities found in the facility search are displayed in a list form on a screen as choices, and in which, when a facility is specified as a selection candidate, path information of a path to the specified facility is displayed on the same screen as the listed facilities;

displaying the drawn search image on a screen; and specifying, when the search image is displayed on the screen, a facility included in the search image as the selection candidate.

18. A facility searching method for a navigation apparatus according to claim 17, wherein the path information includes at least one of a driving distance and a driving time to reach a specified facility.

19. A facility searching method for a navigation apparatus according to claim 17, wherein the path information includes a map image which includes a driving path to reach a specified facility.

20. A facility searching method for a navigation apparatus according to claim 19, further comprising: detecting the position of a vehicle, wherein the map image includes a driving path which connects the facility serving as the specified selection candidate and the detected position of the vehicle.

* * * * *